United States Patent
Funayama et al.

(10) Patent No.: US 9,713,981 B2
(45) Date of Patent: Jul. 25, 2017

(54) OBJECT DETECTION DEVICE AND OBJECT DETECTION METHOD

(71) Applicant: TOYOTA JIDOSHA KABUSHIKI KAISHA, Toyota-shi, Aichi (JP)

(72) Inventors: Ryuji Funayama, Yokohama (JP); Jun Sato, Susono (JP); Hideo Fukamachi, Hadano (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/902,022

(22) PCT Filed: Jul. 11, 2013

(86) PCT No.: PCT/JP2013/069025
§ 371 (c)(1),
(2) Date: Dec. 30, 2015

(87) PCT Pub. No.: WO2015/004781
PCT Pub. Date: Jan. 15, 2015

(65) Prior Publication Data
US 2016/0229339 A1    Aug. 11, 2016

(51) Int. Cl.
*B60Q 5/00* (2006.01)
*B60R 21/013* (2006.01)
(Continued)

(52) U.S. Cl.
CPC ............ *B60Q 5/006* (2013.01); *B60R 21/013* (2013.01); *G01S 3/803* (2013.01); *G01S 11/14* (2013.01)

(58) Field of Classification Search
CPC ...................................... B60Q 5/008
(Continued)

(56) References Cited

U.S. PATENT DOCUMENTS

| 2012/0062391 A1* | 3/2012 | Pan | H03G 3/32 340/901 |
| 2012/0323532 A1* | 12/2012 | Yoshioka | G08G 1/166 702/189 |
| 2013/0154852 A1* | 6/2013 | Kim | B60Q 5/006 340/904 |

FOREIGN PATENT DOCUMENTS

| JP | 585288 A | 4/1993 |
| JP | 592767 U | 12/1993 |

(Continued)

OTHER PUBLICATIONS

International Search Report dated Oct. 15, 2013, issued by the International Bureau in corresponding International Application No. PCT/JP2013/069025.

*Primary Examiner* — Kevin Kim
(74) *Attorney, Agent, or Firm* — Sughrue Mion, PLLC

(57) ABSTRACT

A sound collecting unit (10) mounted on a vehicle is configured to collect sounds, a frequency resolution unit (21c) is configured to perform frequency analysis on the collected sound information, and when an object around the vehicle is detected based on a frequency characteristic of the sound information, a traveling sound detecting unit (21d) is configured to perform object detection such that object detection using a predetermined frequency band when a sound pressure of the predetermined frequency band is high in a frequency characteristic of a sound reproduced from a reproduction unit (11) mounted on the vehicle is more suppressed than object detection using a predetermined frequency band when a sound pressure of the predetermined frequency band is low in the frequency characteristic of the sound reproduced from a reproduction unit (11).

4 Claims, 7 Drawing Sheets

(51) Int. Cl.
*G01S 3/803* (2006.01)
*G01S 11/14* (2006.01)

(58) Field of Classification Search
USPC .................................................. 340/435, 436
See application file for complete search history.

(56) References Cited

FOREIGN PATENT DOCUMENTS

| | | |
|---|---|---|
| JP | 2010208439 A | 9/2010 |
| JP | 2013068428 A | 4/2013 |

* cited by examiner

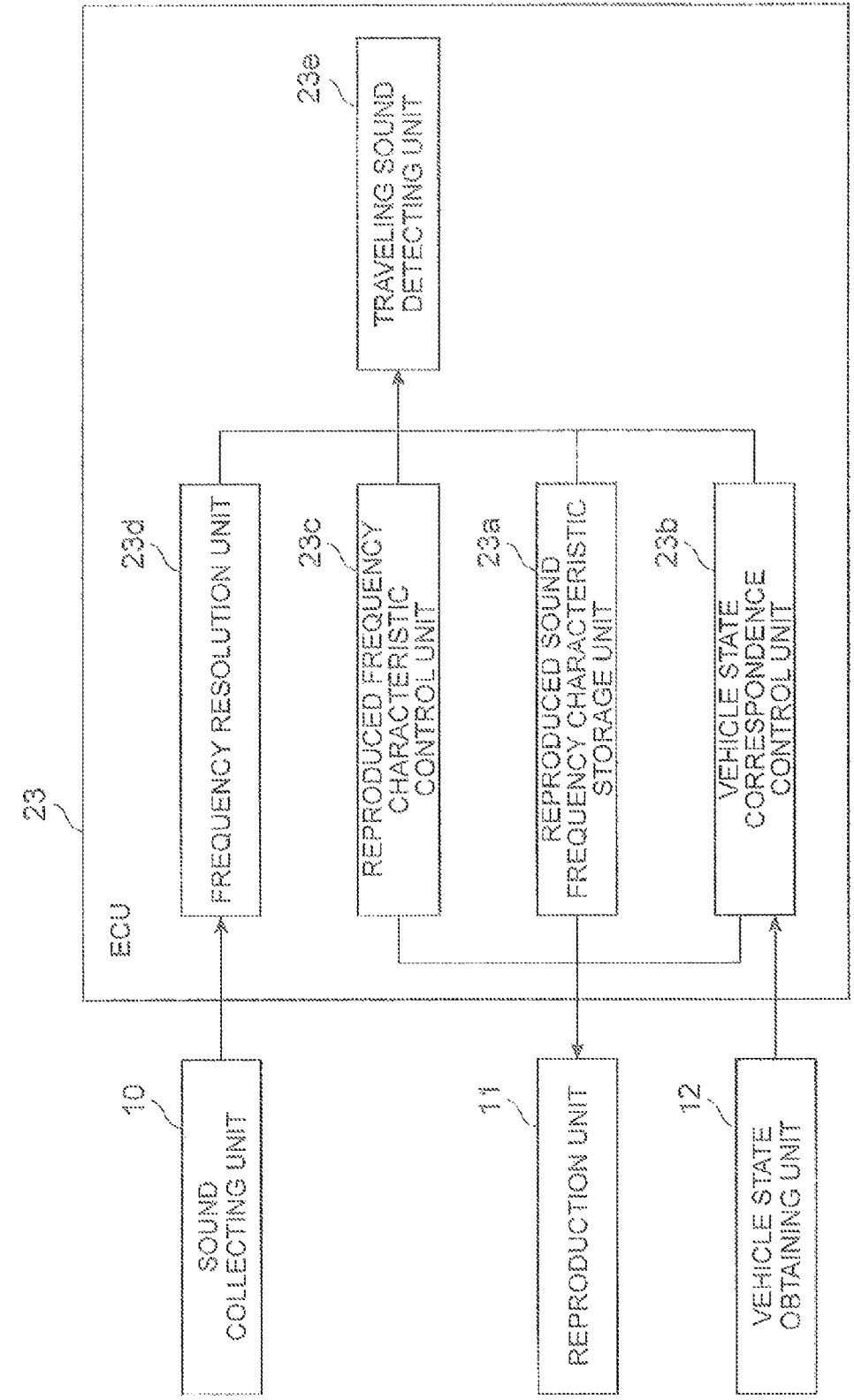

OBJECT DETECTION DEVICE AND OBJECT DETECTION METHOD

CROSS REFERENCE TO RELATED APPLICATIONS

This application is a National Stage of International Application No. PCT/JP2013/069025 filed Jul. 11, 2013, the contents of which are incorporated herein by reference in their entirety.

TECHNICAL FIELD

The present invention relates to an object detection device and an object detection method that detect an object around a vehicle based on sound information around the vehicle.

BACKGROUND ART

As an object detection device mounted on a vehicle, there has been suggested a device configured to collect sounds around a vehicle and detect an object (for example, a vehicle that generates a traveling sound) which is a sound source by using the collected sound information. A device described in Patent Literature 1 is configured to convert acoustic signals output from a plurality of microphones arranged at predetermined intervals into corrected acoustic signals by respectively removing frequency components of a low frequency band and a high frequency band from the output acoustic signals by using a band-pass filter, calculate a power of a predetermined frequency band which exhibits a characteristic of a traveling sound of a vehicle from the corrected acoustic signals, and determine that there is an approaching vehicle when the power level is greater than a predetermined value. Further, the device is configured to convert the acoustic signals into noise-suppressed signals by removing unnecessary noise components from the corrected acoustic signals, calculate cross-correlation between the noise-suppressed signals of the plurality of microphones, and calculate an approaching direction of the approaching vehicle from an arrival time difference in which the correlation is maximized.

CITATION LIST

Patent Literature

[Patent Literature 1] Japanese Unexamined Utility Model Registration Application Publication No. 5-92767

SUMMARY OF INVENTION

Technical Problem

When a warning device (for example, a warning device configured to notify other pedestrians therearound that a vehicle is approaching) is mounted on the vehicle, the object detection device may collect a warning sound generated from the warning device of a host vehicle. For this reason, the object detection device may mistakenly detect the collected warning sound as a sound generated by an object around the host vehicle, and thus, there is a possibility that the detection accuracy of the object will be degraded.

Accordingly, an object of the present invention is to provide an object detection device and an object detection method capable of detecting an object around a vehicle from collected sound information with high accuracy even when a warning sound is generated.

Solution to Problem

An object detection device according to the present invention is an object detection device configured to detect an object around a vehicle based on sound information around the vehicle. The device includes: a sound collecting unit mounted on the vehicle; an analysis unit configured to perform frequency analysis on sound information collected by the sound collecting unit; and a detection unit configured to detect the object around the vehicle based on a frequency characteristic of the sound information analyzed by the analysis unit. Based on a frequency characteristic of a warning sound generated from a warning device mounted on the vehicle, the detection unit is configured to perform object detection such that object detection using a predetermined frequency band when a sound pressure of the predetermined frequency band of the warning sound is high is more suppressed than object detection sing a predetermined frequency band when a sound pressure of a predetermined frequency band of the warning sound is low.

The vehicle mounts the warning device thereon, and a warning sound is generated from the warning device around the vehicle. The object detection device is configured to collect sounds by the sound collecting unit of the vehicle, and obtain sound information regarding the collected sounds. In addition to a sound generated from the object around the vehicle, sound generated from the warning device of the vehicle is included in the sounds collected by the sound collecting unit. The object detection device is configured to perform the frequency analysis on the collected sound information by the analysis unit, and obtain the frequency characteristic of the sound information. The object detection device is configured to detect the object around the vehicle based on the frequency characteristic of the sound information by the detection unit. Particularly, when the sound pressure of the predetermined frequency band included in the frequency characteristic of the warning sound is high, since the predetermined frequency band is affected by the warning sound, there is a high possibility that the warning sound will be mistakenly detected due to the use of the predetermined frequency band. Thus, the detection unit is configured to perform the object detection such that the object detection using the predetermined frequency band of the frequency characteristic of collected sound information when the sound pressure of the predetermined frequency band of the warning sound is high is more suppressed than the object detection using the predetermined frequency band when the sound pressure of the predetermined frequency band of the warning sound is low. As stated above, even when the warning sound is generated from the vehicle, by suppressing the object detection using the frequency band in which the sound pressure of the warning sound is high, the object detection device can prevent the warning sound from being mistakenly detected as the sound generated by the object around the vehicle, and can detect the object around the vehicle from the collected sound information with high accuracy.

In the object detection device of the present invention, the warning sound generated from the warning device is capable of being intermittently generated, and the detection unit is configured to perform object detection by using all frequency bands of the frequency characteristic of the sound information analyzed by the analysis unit for a period of time during which the warning sound is not generated.

The warning sound is capable of being intermittently generated, and there are a period of time during which the warning sound is generated and a period of time during which the warning sound is not generated. Since the warning sound is not included in the sounds collected by the sound collecting unit for the period of time during which the warning sound is not generated, the warning sound is not mistakenly detected. Thus, for the period of time during which the warning sound is not generated, the detection unit is configured to perform the object detection by using all frequency bands of the sound information collected for the period of time during which the warning sound is not generated. When the warning sound is intermittently generated, by performing the object detection by using all the frequency bands of the frequency characteristic of the collected sound information for the period of time during which the warning sound is not generated, the object detection device can detect the object around the vehicle by using all the frequency bands of the frequency characteristic of the collected sound information with higher accuracy without mistakenly detecting the warning sound as the sound generated by the object around the vehicle.

In the object detection device of the present invention, the frequency characteristic of the warning sound generated from the warning device is capable of being changed depending on change in time, and the detection unit is configured to change a frequency band used in the object detection according to the frequency characteristic of the warning sound changed depending on the change in time.

The frequency characteristic of the warning sound is capable of being changed depending on the change in time, and the frequency band in which the sound pressure of the warning sound is high and the frequency band in which the pressure sound is low are changed with time. When the sound pressure of the predetermined frequency band of the warning sound is high at an arbitrary time, since the predetermined frequency band is affected by the warning sound, there is a high possibility that the warning sound will be mistakenly detected due to the use of the predetermined frequency band. Thus, the detection unit is configured to change the frequency band used in the object detection according to the frequency characteristic of the warning sound changed depending on the change in time such that the object detection is not affected by the warning sound. As described previously, in the object detection device, when the frequency characteristic of the warning sound is changed depending on the change in time, by changing the frequency band used in the object detection according to the changed frequency characteristic, it is possible to prevent the warning sound from being mistakenly detected as the sound generated by the object around the vehicle even when the frequency characteristic of the warning sound is changed, and it is possible to detect the object around the vehicle from the collected sound information with high accuracy.

In the object detection device of the present invention, the detection unit is configured to inhibit object detection using a predetermined frequency band which is greater than a reference value when a sound pressure of a predetermined frequency band of the warning sound is greater than the reference value, and perform object detection using a predetermined frequency band which is less than the reference value when a sound pressure of a predetermined frequency band of the warning sound is less than the reference value. As mentioned above, by inhibiting the object detection using the frequency band in which the sound pressure of the warning sound is greater than a reference value, the object detection device can prevent the warning sound from being mistakenly detected as the sound generated by the object around the vehicle, and can detect the object around the vehicle from the collected sound information with high accuracy.

An object detection method according to the present invention is an object detection method for detecting an object around a vehicle based on sound information around the vehicle. The method includes: a sound collecting step of being mounted on the vehicle; an analysis step of performing frequency analysis on sound information collected in the sound collecting step; and a detection step of detecting the object around the vehicle based on a frequency characteristic of the sound information analyzed in the analysis step. Based on a frequency characteristic of a warning sound generated from a warning device mounted on the vehicle, the detection step is performed such that object detection using a predetermined frequency band when a sound pressure of the predetermined frequency band of the warning sound is high is more suppressed than object detection using a predetermined frequency band when a sound pressure of the predetermined frequency band of the warning sound is low. The object detection method performs the same operations as that of the object detection device, and has the same effects as those of the object detection device.

Advantageous Effects of Invention

According to the present invention, even when a warning sound is generated from a vehicle, by suppressing object detection using a frequency band in which a sound pressure of the warning sound is high, it is possible to prevent the warning sound from being mistakenly detected as a sound generated by an object around the vehicle, and it is possible to detect the object around the vehicle from collected sound information with high accuracy.

BRIEF DESCRIPTION OF DRAWINGS

FIGS. 3A and 3B show an example of a frequency characteristic of an approaching notification sound depending on a speed of a host vehicle, in which FIG. 3A shows a case where the speed is low, and FIG. 3B shows a case where the speed is high.

FIG. 6 is a schematic diagram of an approaching vehicle detecting device according to a third embodiment.

FIGS. 7A, 7B, 7C and 7D an example in which a frequency characteristic of an approaching notification sound is changed depending on change in time, in which FIG. 7A shows a basic frequency characteristic, FIG. 7B shows a first frequency characteristic resolved from the basic frequency characteristic, FIG. 7C shows a second frequency characteristic resolved from the basic frequency characteristic, and FIG. 7D shows a third frequency characteristic resolved from the basic frequency characteristic.

DESCRIPTION OF EMBODIMENTS

Figure 1:
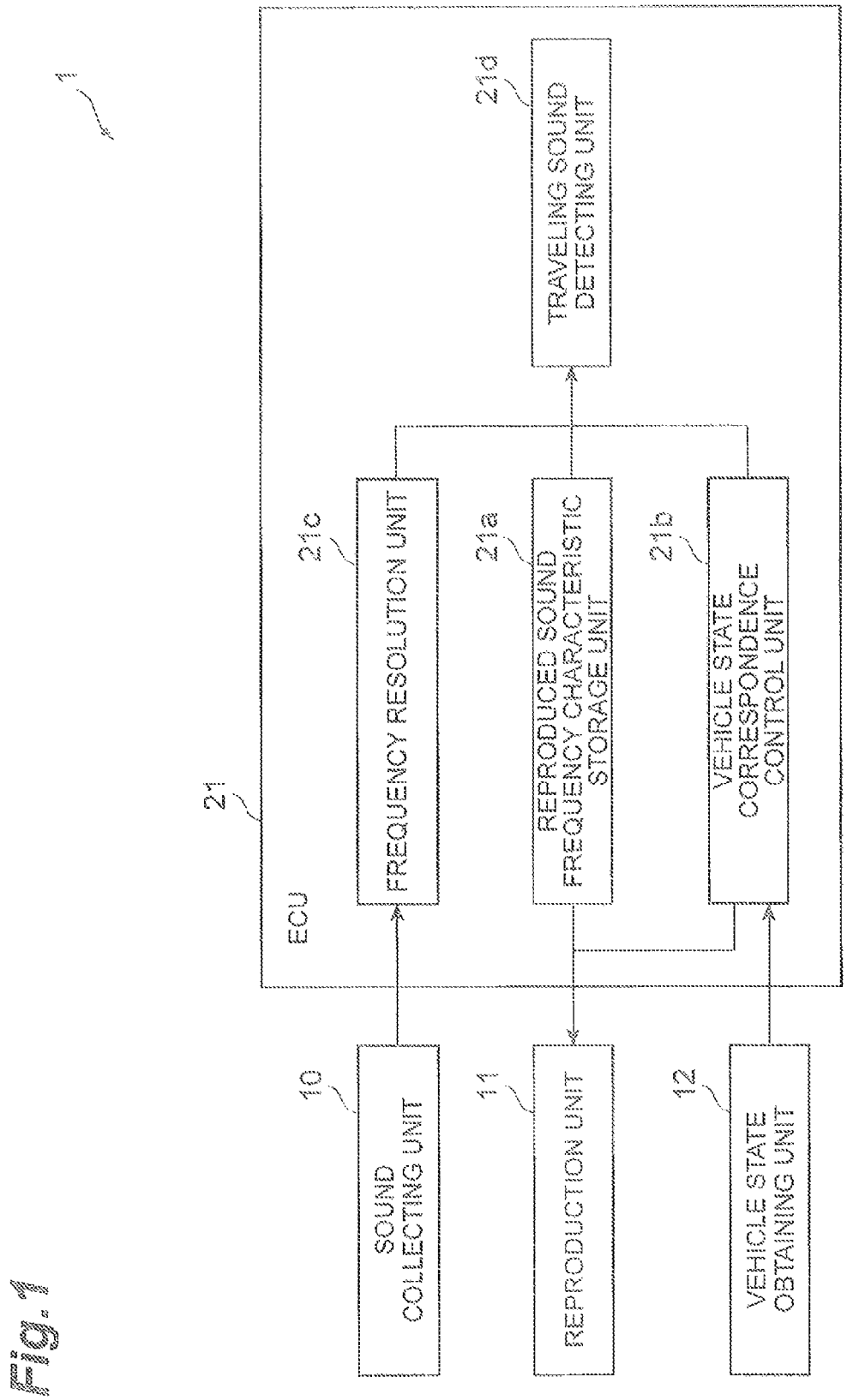
FIG. 1 is a schematic diagram of an approaching vehicle detecting device according to a first embodiment.

Hereinafter, embodiments of an object detection device and an object detection method according to the present invention will be described with reference to the drawings. In the respective drawings, the same or corresponding elements will be assigned the same reference numerals, and redundant description thereof will be omitted.

In the present embodiment, the present invention is applied to an approaching vehicle detecting device mounted on a vehicle. The approaching vehicle detecting device according to the present embodiment is configured to detect a vehicle approaching a host vehicle based on sounds collected, by a microphone, and supply information regarding the detected approaching vehicle to a driving support device. The approaching vehicle is detected by detecting a traveling sound (a sound source) of other vehicles around the host vehicle and determining whether or not the another detected vehicle (a sound source) is approaching the host vehicle.

The vehicle according to the present embodiment is a vehicle capable of traveling by a driving power source (for example, a motor) other than an engine, and is, for example, a hybrid car, or an electric car. In order to notify a pedestrian (particularly, a person who is visually impaired) around the host vehicle that a vehicle is approaching, the vehicle generates an approaching notification sound (a warning sound). The frequency characteristic of the approaching notification sound is changed depending on a change of a vehicle state (a speed, an engine speed, a motor speed, or a brake-pedal depression amount). The approaching notification sound may be basically generated when the vehicle travels. Particularly, when there is a pedestrian around the vehicle and the vehicle travels at a low speed (for example, up to approximately 20 km/h), the approaching notification sound is generated. The approaching notification sound may be generated when the vehicle travels by only a driving power source (for example, a motor) other than an engine.

The approaching notification sound may be an artificial sound that is easily recognized by a person who hears the sound and is not a cacophonous sound, and may be arbitrarily set by a designer. For example, when a sound resembling the traveling sound of the vehicle is used as the approaching notification sound, the approaching notification sound has a frequency characteristic similar to the frequency characteristic of the actual traveling sound of the vehicle. Even when the approaching notification sound does not resemble the traveling sound, it is difficult to detect the traveling sound of the vehicle in frequency bands (frequency bands occupied by the approaching notification sound) in which a sound pressure of the frequency characteristic of the approaching notification sound is high. Here, the approaching vehicle detecting device according to the present embodiment is configured to detect the approaching vehicle so as not to mistakenly detect the approaching notification sound generated from the host vehicle as the traveling sound of the vehicle around the host vehicle by using the frequency characteristic of the approaching notification sound. There are provided three embodiments as the present embodiment. The first embodiment corresponds to a case where a basic approaching notification sound is generated, the second embodiment corresponds to a case where an approaching notification sound is intermittently generated, and the third embodiment corresponds to a case where an approaching notification sound of which a frequency characteristic is changed with time is generated.

Examples of the traveling sound of the vehicle include a road noise (a fricative sound between a tire surface and a road surface), a pattern noise (air vortex (compression and release) in tire grooves), an engine sound, and a wind noise. It is empirically known that the traveling sound of the vehicle is a sound of which distinguishing frequency bands are present near a frequency band of 800 to 3000 Hz.

Figure 2:
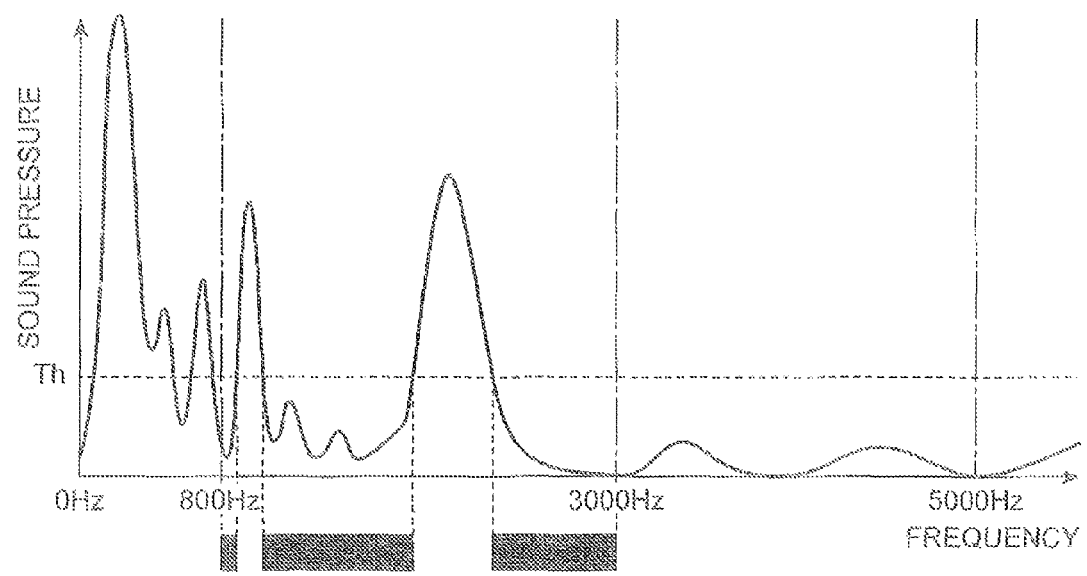
FIG. 2 shows an example of a frequency characteristic of an approaching notification sound.
Figure 3A:
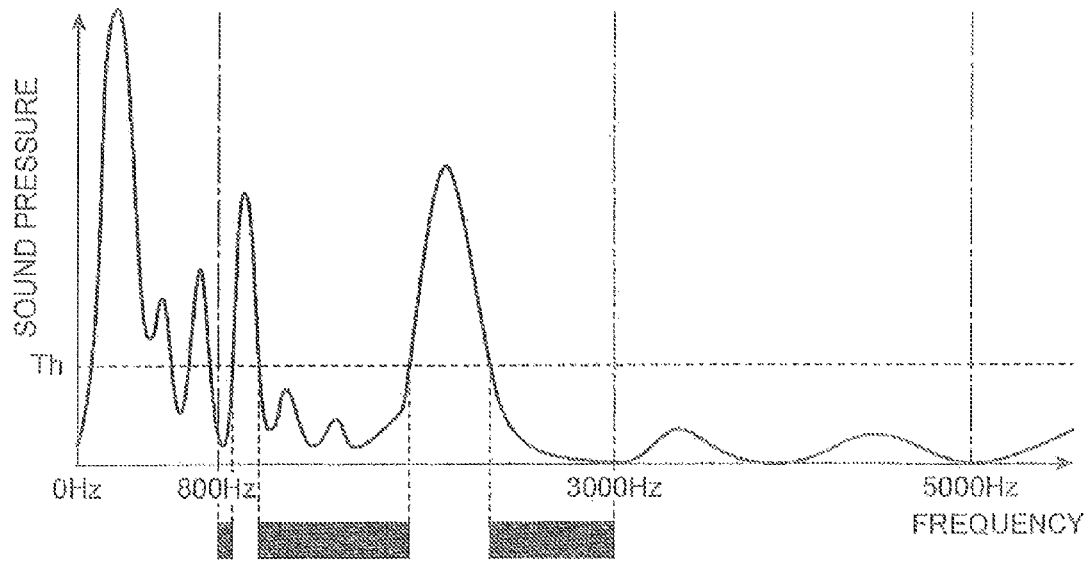
Figure 3B:
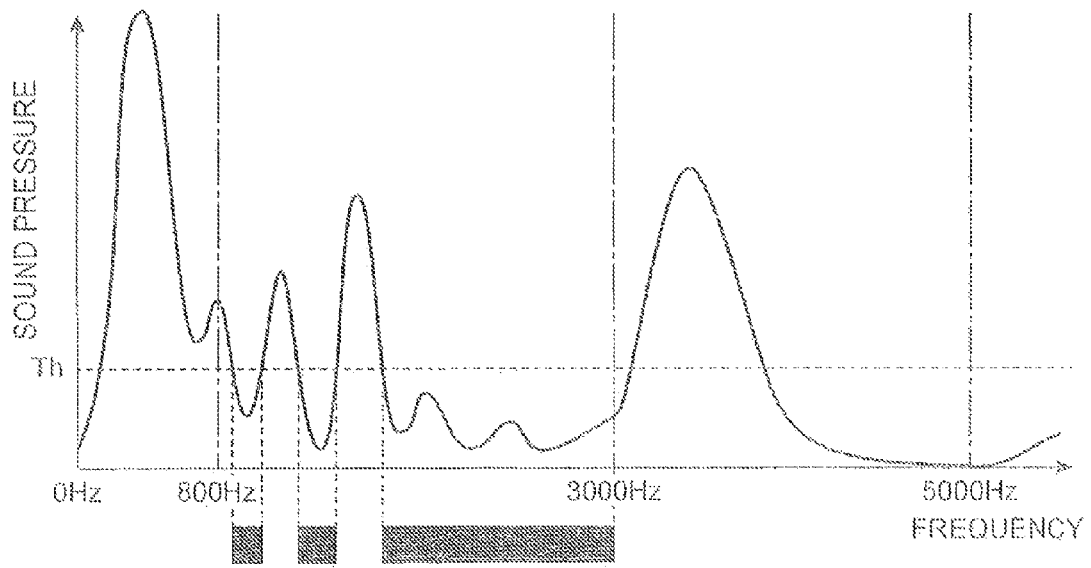

An approaching vehicle detecting device 1 according to the first embodiment will be described with reference to FIGS. 1, 2, 3A and 3B. FIG. 1 is a configuration diagram of the approaching vehicle detecting device according to the first embodiment. FIG. 2 shows an example of the frequency characteristic of an approaching notification sound. FIGS. 3A and 3B show an example of the frequency characteristic of the approaching notification sound depending on the speed of the host vehicle.

The approaching vehicle detecting device 1 is configured to perform frequency analysis on the respective sound information items obtained by collecting sounds using a plurality of microphones, detect a traveling sound based on a difference between the arrival times of the sounds between a plurality of frequency characteristics on which the frequency analysis has been performed, and determine whether or not the detected traveling sound is approaching the host vehicle. Particularly; the approaching vehicle detecting device 1 is configured to detect the traveling sound by excluding the frequency bands the frequency bands occupied by the approaching notification sound) in which the sound pressure of the approaching notification sound with the frequency characteristic of the collected sound information is high so as not to mistakenly detect the approaching notification sound generated in the host vehicle as the traveling sound of another vehicle around the host vehicle. When the frequency characteristic of the approaching notification sound is changed depending on the state of the host vehicle, the approaching vehicle detecting device 1 is configured to detect the traveling sound by excluding the frequency bands in which the pressure of the approaching notification sound is high depending on the changed frequency characteristic.

The approaching vehicle detecting device 1 includes a sound collecting unit 10, a reproduction unit 11, a vehicle state obtaining unit 12, and an electronic control unit (ECU) 21 (a reproduced sound frequency characteristic storage unit 21a, a vehicle state correspondence control unit 21b, a frequency resolution unit 21c, and a traveling sound detecting unit 21d). In the first embodiment, the sound collecting unit 10 corresponds to a sound collecting unit described in the claims, the reproduction unit 11, the reproduced sound frequency characteristic storage unit 21a, and the vehicle state correspondence control unit 21b correspond to a warning unit described in the claims, the frequency resolution unit 21c corresponds to an analysis unit described in the claims, and the traveling sound detecting unit 21d corresponds to a detection unit described in the claims.

The sound collecting unit 10 is a microphone array that includes two or more microphones. The two or more microphones are arranged at a front end of the vehicle in a side direction (a leftward or rightward direction) of the vehicle (for example, the microphones are arranged in positions which are bilaterally symmetric with respect to the center of the vehicle at the same height, and are arranged so as to face a front side or an outside of the front side). The microphone is an acoustic-to-electric transducer, and is configured to collect a sound around the outside of the vehicle, and convert the collected sound into an analog electrical signal. The sound collecting unit 10 is configured to convert sounds collected by the respective microphones into electrical signals at every predetermined time interval, and transmit the collected sound signals constructed by analog electrical signals to the ECU 21. Hereinafter, an example in which the microphone array inducing two microphones is used as the sound collecting unit 10 will be described.

The reproduction unit 11 includes one or a plurality of vehicle speakers and amplifiers. The speaker is disposed in a location (for example, inside of an engine compartment of the vehicle) at which sound (the approaching notification sound) reproduced from the outside of the vehicle is capable of being heard. When the reproduced sound signal (the electrical signal) is received from the ECU 21, the reproduction unit 11 is configured to amplify the reproduced sound signal in the amplifier, and convert the amplified reproduced sound signal into voice to output the converted voice in the speaker.

The vehicle state obtaining unit 12 is a sensor for obtaining (detecting) various states of the vehicle. Examples of the obtained state of the vehicle include a speed, an engine speed, a motor speed, and a brake pedal depression amount. The vehicle state obtaining unit 12 is configured to obtain the state of the vehicle at every predetermined time interval, and transmit a vehicle state signal indicating the state of the vehicle to the ECU 21.

The ECU 21 is an electronic control unit that includes a central processing unit (CPU), a read-only memory (ROM), and a random-access memory (RAM), and is configured to generally control the approaching vehicle detecting device 1. The ECU 21 is configured to respectively receive the collected sound signals from the sound collecting unit 10 and vehicle state signals from the vehicle state obtaining unit 12 at every predetermined time interval. The ECU 21 includes the reproduced sound frequency characteristic storage unit 21a in a predetermined area of the ROM. The ECU 21 is configured to perform various processing of the vehicle state correspondence control unit 21b, the frequency resolution unit 21c and the traveling sound detecting unit 21d at every predetermined time interval by loading application programs stored in the ROM into the RAM and executing the loaded application programs in the CPU. By performing the various processing, the ECU 21 is configured to transmit the reproduced sound signal to the reproduction unit 11, or transmit an approaching vehicle information signal to the driving support device (not shown).

As pre-processing, the ECU 21 is configured to respectively convert the collected sound signals to digital electrical signals whenever the collected sound signals (analog electrical signals) of two microphones are respectively received. The ECU 21 is configured to remove predetermined frequency bands (a higher frequency hand and a lower frequency band than a band which sufficiently includes the distinguishing frequency band of the traveling sound of the vehicle) from the collected sound signals (the digital electrical signals). It is assumed that the collected sound signals of the respective microphones on which the pre-processing has been performed are $x_1(t)$ and $x_2(t)$. The collected sound signals $x_1(t)$ and $x_2(t)$ are signals in the time domain. t represents time. The respective collected sound signals $x_1(t)$ and $x_2(t)$ on which the pre-processing has been performed are stored in a predetermined area of the RAM of the ECU 21 for a predetermined period of time (a period of time sufficient for calculating cross-correlation).

The reproduced sound frequency characteristic storage unit 21a is configured to store the frequency characteristic (a characteristic indicating a sound pressure corresponding to each frequency) of the approaching notification sounds which are the reproduced sounds. The stored approaching notification sound is a previously known frequency characteristic created by the designer. FIG. 2 shows an example of the frequency characteristic of the approaching notification sound, and a vertical axis represents a frequency and a horizontal axis represents a sound pressure. As can be seen from this example, in order to set the approaching notification sound to be a sound that is easily recognized by a person who hears the sound and is not a cacophonous sound, there are frequency bands in which a sound pressure is high, and frequency bands in which a sound pressure is low. The frequency bands in which the sound pressure of the approaching notification sound is high are also included in a frequency band of 800 to 3000 Hz which is the distinguishing frequency band of the traveling sound of the vehicle. Since the frequency bands in which the sound pressure of the approaching notification sound is high are occupied by the approaching notification sound and mask the collected traveling sound of another vehicle around the host vehicle, the detection of the traveling sound of another vehicle is affected. For this reason, when the detection is performed using the frequency bands in which the sound pressure of the approaching notification sound is high, there is a possibility that the approaching notification sound will be mistakenly detected as the traveling sound. The frequency characteristic of the approaching notification sound may be arbitrarily set, in addition to the frequency characteristic described above.

The reproduced sound frequency characteristic storage unit 21a is configured to store the frequency characteristic of the approaching notification sound changed depending on the change of the vehicle state. Examples of the vehicle state include a speed, an engine speed, a motor speed, and a brake depression amount. For example, as a pattern in which the frequency characteristic is changed, a pattern of the frequency characteristic is set such that a sound pressure in a high frequency band becomes higher as the speed of the host vehicle increases. FIGS. 3A and 3B an example of the frequency characteristic of the approaching notification sound changed depending on the change of the speed. FIG. 3A shows a frequency characteristic at a low speed, and FIG. 3B shows a frequency characteristic at a high speed. In this example, the frequency characteristic at a high speed shown in FIG. 3B exhibits a characteristic in which the entire frequency characteristic at a low speed shown in FIG. 3A is widened. In addition to the pattern described above, the pattern of the frequency characteristic changed depending on the vehicle state such as a speed may be arbitrarily set. The frequency characteristic changed depending on the vehicle state may be a frequency characteristic changed depending on a change of one vehicle state, or may be a frequency characteristic changed depending on a combination of changes of a plurality of vehicle states.

The vehicle state correspondence control unit 21b is configured to extract the frequency characteristic of the approaching notification sound corresponding to the vehicle state obtained in the vehicle state obtaining unit 12 from the frequency characteristics of the approaching notification sounds corresponding to the vehicles states stored in the reproduced sound frequency characteristic storage unit 21a. The frequency characteristic of the approaching notification sound extracted in the vehicle state correspondence control unit 21b is used in the traveling sound detecting unit 21d. The ECU 21 is configured to generate a reproduced sound signal (an analog electrical signal) for reproducing the approaching notification sound having the extracted frequency characteristic, and to transmit the reproduced sound signal to the reproduction unit 11.

The frequency resolution unit 21c is configured to respectively perform frequency resolution (frequency analysis) on the collected sound signals $x_1(t)$ and $x_2(t)$ of the time domain, and obtain collected sound signals $X_1(t)$ and $X_2(t)$ of the frequency domain. In the present embodiment, the discrete Fourier transform (DFT) is used as a frequency resolution method. As specific processing, the frequency resolution unit 21c is configured to perform the discrete Fourier transform on the collected sound signal $x_1(t)$ of one microphone, and obtain a collected sound signal $X_1(\omega)$ of the frequency domain by Expression (1). The frequency resolution unit 21c is configured to perform the discrete Fourier transform on the collected sound signal $x_2(t)$ of the other microphone, and obtain a collected sound signal $X_2(\omega)$ of the frequency domain by Expression (2). $\omega$ represents a frequency.

$$X_1(\omega) = DFT(x_1(t)) \quad (1)$$

$$X_2(\omega) = DFT(x_2(t)) \quad (2)$$

The traveling sound detecting unit 21d is configured to obtain a cross-correlation value $R_{12}(\tau)$ between the collected sound signals $X_1(\omega)$ and $X_2(\omega)$ of the frequency domain on which the frequency resolution has been performed in the frequency resolution unit 21c, detect a traveling sound based on a difference between the sound arrival times obtained from the cross-correlation value $R_{12}(\tau)$, and determine whether or not the detected traveling sound is approaching the host vehicle. In the present embodiment, generalized cross-correlation phase transform. (GCC-PHAT) is used as the method of obtaining the cross-correlation value. Specifically, the cross-correlation value $R_{12}(\tau)$ is calculated using the collected sound signals $X_1(\omega)$ and $X_2(\omega)$ by Expression (3). $\tau$ represents a delay time (a time difference) in the cross-correlation. T $\tau$ represents the maximum value of the delay time. $X^*_2(\tau)$ represents the complex conjugate of $X_2(\tau)$. IDFT represents inverse discrete Fourier transform.

$$R_{12}(\tau) = \frac{1}{T} IDFT \left\{ \frac{X_1(\omega)X^*_2(\omega)}{\sqrt{|X_1(\omega)|^2} \sqrt{|X_2(\omega)|^2}} \right\} \quad (3)$$

In Expression (3) above, the cross-correlation $R_{12}(\tau)$ is calculated using all the frequency bands included in the collected sound signals $X_1(\omega)$ and $X_2(\omega)$. As mentioned previously, since the frequency bands of the frequency characteristic of the approaching notification sound in which the sound pressure is high are occupied by the approaching notification sound, the detection of the traveling sound is affected. Thus, the frequency bands in which the sound pressure is high in the frequency characteristic of the approaching notification sound are not used to calculate the cross-correlation value $R_{12}(\tau)$ (or to detect the traveling sound). Accordingly, in the present embodiment, a function $M(\omega)$ represented by Expression (4) is introduced. Th used in the function $M(\omega)$ is a threshold for determining whether or not the sound pressure affects the detection of the traveling sound (whether or not the sound pressure is occupied by the approaching notification sound) in the frequency characteristic of the approaching notification sound, and is previously set according to circumstances. $X_m(\omega)$ represents the frequency characteristic of the approaching notification sound reproduced from the reproduction unit 11, and represents the frequency characteristic of the approaching notification sound extracted in the vehicle state correspondence control unit 21b.

$$M(\omega) = \begin{cases} 1 & (X_m(\omega) \le Th) \\ 0 & (\text{otherwise}) \end{cases} \quad (4)$$

In the frequency bands in which the sound pressure of the frequency characteristic $X_m(\omega)$ is equal to or less than the threshold Th, the function $M(\omega)$ is 1, and these frequency bands are used to calculate the cross-correlation value $R_{12}(\tau)$. Meanwhile, in the frequency bands in which the sound pressure of the frequency characteristic $X_m(\omega)$ exceeds the threshold Th, the function $M(\omega)$ is 0, and these frequency bands are not used to calculate the cross-correlation value $R_{12}(\tau)$. In the examples shown in FIGS. 2 and 3, the frequency bands represented by black bars in a range of 800 to 3000 Hz are the frequency bands in which the sound pressure is equal to or less than the threshold Th.

By adding the function $M(\omega)$ to Expression (3), the frequency bands that affect the detection of the traveling sound are excluded from the frequency characteristic $X_m(\omega)$ of the approaching notification sound, and the cross-correlation value $R_{12}(\tau)$ is calculated. That is, the cross-correlation value $R_{12}(\tau)$ is calculated by Expression (5) to which the function $M(\omega)$ has been added. In Expression (5), the sum of products of $X_1(\omega)$ and $X^*_2(\omega)$ is multiplied by 1 in the frequency bands in which the sound pressure of the frequency characteristic $X_m(\omega)$ of the approaching notification sound is equal to or less than the threshold Th, and the sum of products of $X_1(\omega)$ and $X^*_2(\omega)$ is multiplied by 0 in other frequency bands. By using Expression (5), in the examples shown in FIGS. 2 and 3, the value of the function $M(\omega)$ is 1 in the frequency bands represented by the black bars in a range of 800 to 3000 Hz, and the cross-correlation value $R_{12}(\tau)$ is calculated in the frequency bands represented by the black bars.

$$R_{12}(\tau) = \frac{1}{T} IDFT \left\{ \frac{M(\omega)X_1(\omega)X^*_2(\omega)}{\sqrt{|X_1(\omega)|^2} \sqrt{|X_2(\omega)|^2}} \right\} \quad (5)$$

Although the configuration in which the function $M(\omega)$ is introduced and the threshold Th is set to a constant value has been described, any configuration may be used. For example, a configuration in which the sound pressure of the approaching notification sound is compared with the sound pressure of the collected sound signals of the collected sounds and the sum of products is multiplied by 1 in the frequency bands in which the sound pressure of the collected sound signals is greater than that of the approaching notification sound may be used. In such a configuration, a configuration in which the sum of products is multiplied by 1 in the frequency bands in which a difference between the sound pressures of the approaching notification sound and the collected sound signal is equal to or greater than a predetermined value (for example, 5 dB or more) may be used.

As specific processing, the traveling sound detecting unit 21d is configured to obtain the value of the function $M(\omega)$ of Expression (4) for each frequency $\omega$ by using the frequency characteristic $X_m(\omega)$ of the approaching notification sound extracted in the vehicle state correspondence control unit 21b. The traveling sound detecting unit 21d is configured to sequentially calculate the cross-correlation value $R_{12}(\tau)$ by changing the value of $\tau$ within a range of —T to T by using the value of the function $M(\omega)$ of each frequency ω and the collected sound signals $X_1(\omega)$ and $X_2(\omega)$ by Expression (5). The traveling sound detecting unit 21*d* is configured to determine whether or not the cross-correlation value $R_{12}(\tau)$ of each τ is equal to or greater than a threshold. The threshold is a threshold for determining whether or not the waveforms of the collected sound signals in which time deviates are similar to each other (or whether or not the traveling sound (the sound source) of the vehicle is present), and is previously set according to circumstances. When the cross-correlation value $R_{12}(\tau)$ of a certain τ is equal to or greater than the threshold, the traveling sound detecting unit 21*d* is configured to determine that the traveling sound (the sound source) of the vehicle is present, and set τ at this time as a sound arrival time difference. The sound arrival time difference has a plus value in some cases, or has a minus value in some cases. The sound arrival time difference has a plus value or a minus value depending on the arrangement of two microphones, which microphone of two microphones is used as its reference to calculate the sound arrival time difference, or the position of the traveling sound (the vehicle).

When it is determined that the traveling sound (the vehicle) is present, the traveling sound detecting unit 21*d* is configured to determine whether or not the absolute value of the sound arrival time difference is less than a threshold. The threshold is a threshold for determining whether or not the traveling sound (the sound source) is approaching based on the sound arrival time difference, and is previously set according to circumstances. When the absolute value of the sound arrival time difference decreases and the absolute value of the sound arrival time difference is less than the threshold, the traveling sound detecting unit 21*d* is configured to determine that the sound source is approaching in the side direction. Meanwhile, when the absolute value of the sound arrival time difference is equal to or greater than the threshold, the traveling sound detecting unit 21*d* is configured to determine that the sound source is not approaching in the side direction, and determine that there is no approaching vehicle. In this case, when the absolute value of the sound arrival time difference decreases but the absolute value of the sound arrival time difference is equal to or greater than the threshold, the traveling sound is approaching in the side direction, but is not approaching to such an extent that there is a possibility that the host vehicle will collide with the approaching vehicle. When the absolute value of the sound arrival time difference increases after the absolute value of the sound arrival time difference has been determined to be less than the threshold, the traveling sound detecting unit 21*d* is configured to determine that the sound source is distant in the side direction.

The ECU 21 is configured to generate approaching vehicle information based on the detection result in the traveling sound detecting unit 21*d*, and transmit an approaching vehicle information signal including the approaching vehicle information to the driving support device. Examples of the approaching vehicle information include information indicating the presence or absence of the approaching vehicle, and information regarding the approaching direction or the relative distance between the approaching vehicle and the host vehicle when there is an approaching vehicle.

The flow of the operation of the approaching vehicle detecting device 1 having the above-described configuration will be described. The vehicle state obtaining unit 12 is configured to obtain the vehicle state such as the speed of the host vehicle, and transmit a vehicle state signal indicating the vehicle state to the ECU 21 at every predetermined time interval. When the vehicle state signal is received, the ECU 21 is configured to extract the frequency characteristic $X_m(\omega)$ of the approaching notification sound corresponding to the vehicle state indicated by the vehicle state signal from the reproduced sound frequency characteristic storage unit 21*a*. The ECU 21 is configured to generate the reproduced sound signal for reproducing the frequency characteristic $X_m(\omega)$ of the approaching notification sound, and transmit the reproduced sound signal to the reproduction unit 11. When the reproduced sound signal is received, the reproduction unit 11 is configured to amplify the reproduced sound signal in the amplifier, and convert the reproduced sound signal into voice to output the approaching notification sound in the speaker.

The respective microphones of the sound collecting unit 10 are configured to collect the respective sounds around the host vehicle, convert the collected sounds to the electrical signals, and transmit the collected sound signals to the ECU 21. Whenever the collected sound signals of the respective microphones are received, the ECU 21 is configured to perform the pre-processing on the collected sound signals, and obtain the collected sound signals $x_1(t)$ and $x_2(t)$ on which the pre-processing has been performed.

The ECU 21 is configured to perform the discrete Fourier transform on the collected sound signal $x_1(t)$ of one microphone to obtain the collected sound signal $X_1(\omega)$ by Expression (1), and is configured to convert the discrete Fourier on the collected sound signal $x_2(t)$ of the other microphone to obtain the collected sound signal $X_2(\omega)$ by Expression (2), at every predetermined time interval. The ECU 21 is configured to calculate the cross-correlation value $R_{12}(\tau)$ for each τ by using the collected sound signals $X_1(\omega)$ and $X_2(\omega)$ and the value of the function $M(\omega)$ for each frequency ω by Expression (5). In this case, the value (1 or 0) of the function $M(\omega)$ represented by Expression (4) for each frequency ω is obtained using the frequency characteristic $X_m(\omega)$ of the approaching notification sound being currently reproduced.

The traveling sound detecting unit 21*d* is configured to determine whether or not the cross-correlation value $R_{12}(\tau)$ of each τ is equal to or greater than the threshold. When the cross-correlation value $R_{12}(\tau)$ is equal to or greater than the threshold, the traveling sound detecting unit 21*d* is configured to determine that the traveling sound (the sound source) around the host vehicle is present, and set τ at this time as the sound arrival time difference. When it is determined that the traveling sound is present, the traveling sound detecting unit 21*d* is configured to determine whether or not the absolute value of the sound arrival time difference is less than the threshold. When the absolute value of the sound arrival time difference decreases and the absolute value of the sound arrival time difference is less than the threshold, the traveling sound detecting unit 21*d* is configured to determine that the sound source is approaching in the side direction. Meanwhile, when the absolute value of the sound arrival time difference is equal to or greater than the threshold, the traveling sound detecting unit 21*d* is configured to determine that the sound source is not approaching in the side direction, and determine that there is no approaching vehicle. When the absolute value of the sound arrival time difference increases after the absolute value of the sound arrival time difference has been determined to be less than the threshold, the traveling sound detecting unit 21*d* is configured to determine that the sound source is distant in the side direction. The ECU 21 is configured to generate the approaching vehicle information based on the detection result, and transmit the approaching vehicle information signal including the approaching vehicle information to the driving support device.

According to the approaching vehicle detecting device 1, even when the approaching notification sound is generated from the host vehicle, since the cross-correlation value is calculated (the traveling sound is detected) by excluding the frequency bands in which the sound pressure of the frequency characteristic of the approaching notification sound exceeds the threshold, it is possible to prevent the approaching notification sound from being mistakenly detected as the traveling sound of the vehicle around the host vehicle, and it is possible to detect the approaching vehicle with high accuracy from the collected sound information. It is possible to appropriately support driving by using high-accuracy information regarding the approaching vehicle.

In the approaching vehicle detecting device 1, the detection of the traveling sound is not affected by the approaching notification sound by using a simple method in which the function $M(\omega)$ using the frequency characteristic $X_m(\omega)$ of the approaching notification sound is introduced and the function $M(\omega)$ is added to the calculation expression of the cross-correlation value of the GCC-PHAT method. Accordingly, there is provided a method that is advantageous in terms of a mounting space, weight, and costs without requiring it to be made difficult for the approaching notification sounds to be collected by providing a special structure at the sound collecting unit 10 (microphone) or the reproduction unit 11 (speaker).

Figure 4:
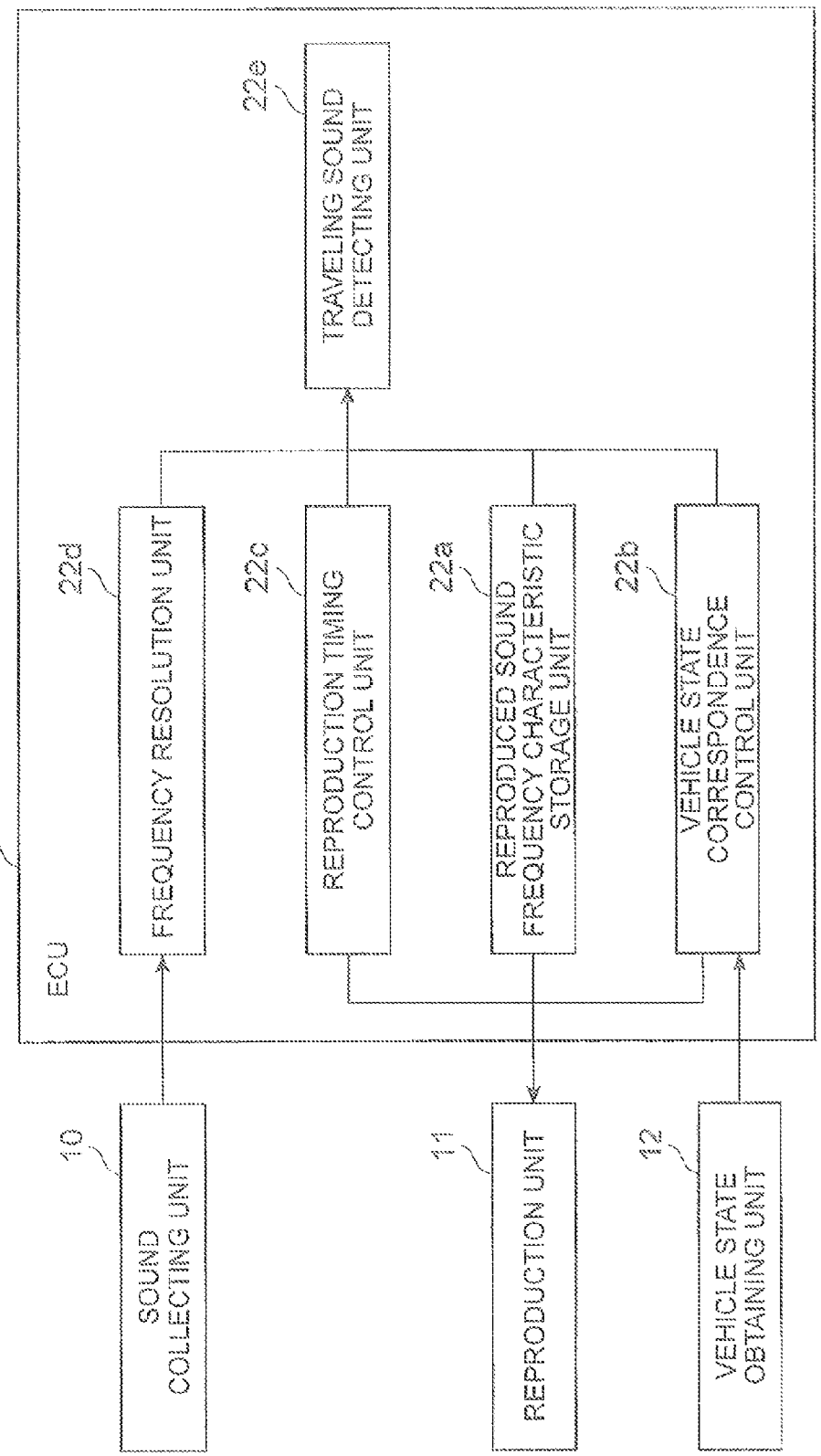
FIG. 4 is a schematic diagram of an approaching vehicle detecting device according to a second embodiment.
Figure 5:
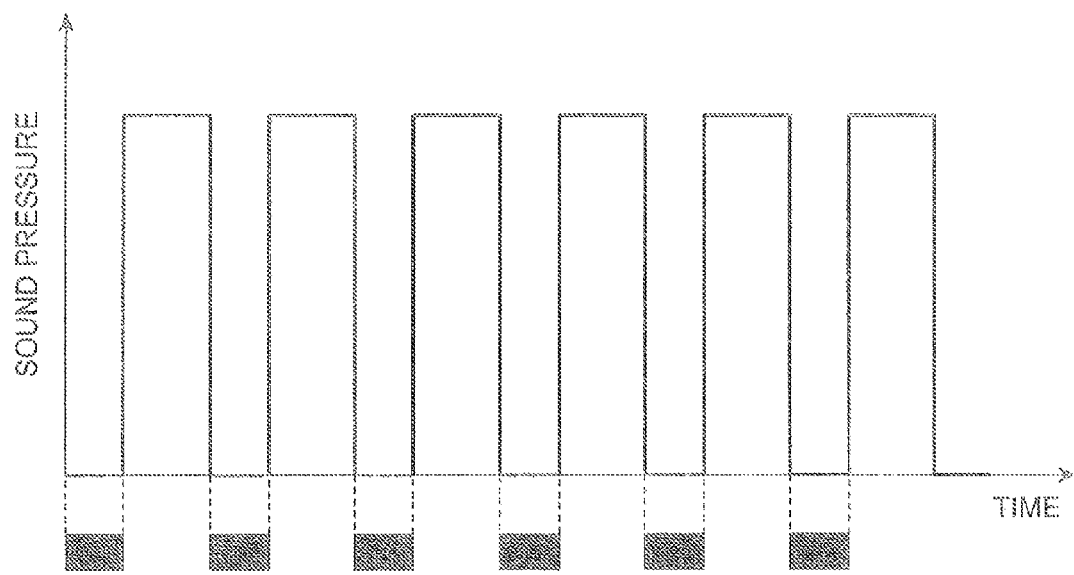
FIG. 5 shows an example of a reproduction timing of an approaching notification sound.

An approaching vehicle detecting device 2 according to a second embodiment will be described with reference to FIGS. 4 and 5. FIG. 4 is a schematic diagram of an approaching vehicle detecting device according to a second embodiment. FIG. 5 shows an example of a reproduction timing of the approaching notification sound.

The approaching vehicle detecting device 2 has a difference from the approaching vehicle detecting device 1 according to the first embodiment in that since the approaching notification sound is intermittently generated in the host vehicle (reproducing and stopping of the approaching notification sound are repeated at short time intervals), the traveling sound is detected for a period of time during which the approaching notification sound is not generated by using all the frequency bands of the frequency characteristic of the sound information collected for the period of time during which the approaching notification sound is not generated (the traveling sound is not detected for a period, during which the approaching notification sound is generated by using the frequency characteristic of the sound information collected for the period during which the approaching notification sound is generated). In the second embodiment, such a difference will be described in detail.

The approaching vehicle detecting device 2 includes a sound collecting unit 10, a reproduction unit 11, a vehicle state obtaining unit 12, and an ECU 22 (a reproduced sound frequency characteristic storage unit 22a, a vehicle state correspondence control unit 22b, a reproduction timing control unit 22c, a frequency resolution unit 22d, and a traveling sound detecting unit 22e). In the second embodiment, the sound collecting unit 10 corresponds to a sound collecting unit described in the claims, the reproduction unit 11, the reproduced sound frequency characteristic storage unit 22a, the vehicle state correspondence control unit 22b and the reproduction timing control unit 22c correspond to a warning unit described in the claims, the frequency resolution unit 22d corresponds to an analysis unit described in the claims, and the traveling sound detecting unit 22e corresponds to a detection unit described in the claims.

The ECU 22 is an electronic control unit that includes a CPU, a ROM, and a RAM, and is configured to generally control the approaching vehicle detecting device 2. The ECU 22 is configured to respectively receive collected sound signals from the sound collecting unit 10 and vehicle state signals from the vehicle state obtaining unit 12 at every predetermined time interval. The ECU 22 includes the reproduced sound frequency characteristic storage unit 22a in a predetermined area of the ROM. The ECU 22 is configured to perform various processing of the vehicle state correspondence control unit 22b, the reproduction timing control unit 22c, the frequency resolution unit 22d and the traveling sound detecting unit 22e at every predetermined time interval by loading application programs stored in the ROM into the RAM and executing the loaded application programs in the CPU. By performing the various processing, the ECU 22 is configured to transmit the reproduced sound signal to the reproduction unit 11, or transmit an approaching vehicle information signal to the driving support device. The reproduced sound frequency characteristic storage unit 22a is the same storage unit as the reproduced sound frequency characteristic storage unit 21a according to the first embodiment, and thus, the description thereof will be omitted. The vehicle state correspondence control unit 22b and the frequency resolution unit 22d perform the same processes as those of the vehicle state correspondence control unit 21b and the frequency resolution unit 21c according to the first embodiment, and thus, the description thereof will be omitted.

The reproduction timing control unit 22c is configured to control a reproduction timing of the approaching notification sound such that reproducing and stopping of the approaching notification sound in the reproduction unit 11 are repeated. A period of time during which the approaching notification sound is reproduced and a period of time during which the reproducing of the approaching notification sound is stopped refer to periods of time during which a person who hears the approaching notification sound does not feel discomforted due to the reproducing and stopping of the approaching notification sound, and refer to periods of time during which the calculation of the cross-correlation value during the stopping of the approaching notification sound (the detection of the traveling sound) is not affected. The reproducing period of time and the stopping period of time are previously set as a predetermined period of time, for example, several tens of milliseconds. The reproducing period of time and the stopping period of time may be set as the same period of time, or may be set as different periods of time. FIG. 5 shows an example of the reproducing and stopping timings of the approaching notification sound, and a horizontal axis represents a time, and a vertical axis represents a sound pressure. This example shows a time zone in which the approaching notification sound is reproduce& in a rectangular shape in which the sound pressure increases, in this example, the reproducing period of time is slightly greater than the stopping period of time. The reproducing period of time and the stopping period of time may be a period of time changed depending on the vehicle state such as a speed. For example, as the speed increases, the respective periods of time become shorter.

As specific processing when the stopping period of time elapses, the reproduction timing control unit 22c is configured to generate the reproduced sound signal (the electrical signal) for reproducing the approaching notification sound having the frequency characteristic extracted in the vehicle state correspondence control unit 22b, start to transmit the reproduced sound signal to the reproduction unit 11, and continue to transmit the reproduced sound signal to the reproduction unit 11 for the reproducing period of time. When the reproducing period of time elapses, the reproduction timing control unit 22c is configured to stop transmitting the reproduced sound signal to the reproduction unit 11, and continue to stop transmitting the reproduced sound signal during the stopping period of time. The reproduction timing control unit 22c is configured to repeatedly perform this processing.

The sound information of the approaching notification sound is not included in the collected sound signals $x_1(t)$ and $x_2(t)$ of the respective microphones of the sound collecting unit 10 for a period of time during which the reproducing of the approaching notification sound is stopped. Accordingly, the frequency characteristic of the approaching notification sound is not also included in the collected sound signals $X_1(t)$ and $X_2(t)$ on which the frequency resolution has been performed in the frequency resolution unit 22d. For this reason, the approaching notification sound does not affect the detection of the traveling sound in all the frequency bands included in the collected sound signals $X_1(t)$ and $X_2(t)$ for a period of time during which the reproducing of the approaching notification sound is stopped.

For a period of time during which the reproducing of the approaching notification sound from the reproduction unit 11 is stopped (for a period of time during which the transmitting of the reproduced sound signal is stopped in the reproduction timing control unit 22c), the traveling sound detecting unit 22e is configured to obtain the cross-correlation value $R_{12}(\tau)$ between the collected sound signals $X_1(t)$ and $X_2(t)$ on which the frequency resolution has been performed in the frequency resolution unit 22d, detect the traveling sound based on the sound arrival time difference obtained from the cross-correlation value $R_{12}(\tau)$, and determine whether or not the detected traveling sound is approaching the host vehicle. In this case, since all the frequency bands included in the collected sound signals $X_1(t)$ and $X_2(t)$ do not affect the detection of the traveling sound during the period of time during which the reproducing of the approaching notification sound is stopped, the cross-correlation value $R_{12}(\tau)$ is obtained using all the frequency bands included in the collected sound signals $X_1(t)$ and $X_2(t)$. In the example shown in FIG. 5, in only the time zones represented by black bars, the cross-correlation value $R_{12}(t)$ is calculated using all the frequency bands included in the collected sound signals $X_1(t)$ and $X_2(t)$, and the traveling sound is detected.

As specific processing, for the period of time during which the reproducing of the approaching notification sound from the reproduction unit 11 is stopped, the traveling sound detecting unit 22e is configured to sequentially calculate the cross-correlation value $R_{12}(\tau)$ by changing the value of $\tau$ within a range of —T to T by using the collected sound signals $X_1(\omega)$ and $X_2(\omega)$ by Expression (3). In the subsequent processing, the traveling sound detecting unit 22e is configured to perform the same processing as that of the traveling sound detecting unit 21d according to the first embodiment. Meanwhile, the traveling sound detecting unit 22e does not perform the processing for the period of time during which the approaching notification sound from the reproduction unit 11 is reproduced.

The traveling sound detecting unit 22e is configured to detect the traveling sound by calculating the cross-correlation value for only the period of time during which the reproducing of the approaching notification sound is stopped. Thus, the frequency resolution unit 22d may ordinarily perform the frequency resolution (the discrete Fourier transform) on the collected sound signals $X_1(t)$ and $X_2(t)$, but may perform the frequency resolution for only the period of time during which the reproducing of the approaching notification sound is stopped.

The flow of the operation of the approaching vehicle detecting device 2 having the above-described configuration will be described. The vehicle state obtaining unit 12 is configured to perform the same operation described in the first embodiment. When the vehicle state signal is received, the ECU 22 is configured to extract the frequency characteristic $X_m(\omega)$ of the approaching notification sound corresponding to the vehicle state indicated by the vehicle state signal from the reproduced sound frequency characteristic storage unit 22a. During the reproducing period of time of the approaching notification sound, the ECU 22 is configured to generate the reproduced sound signal for reproducing the frequency characteristic $X_m(\omega)$ of the approaching notification sound, and transmit the reproduced sound signal to the reproduction unit 11. When the reproduced sound signal is received, the reproduction unit 11 is configured to amplify the reproduced sound signal in the amplifier, and convert the reproduced sound signal into voice to output the approaching notification sound in the speaker. Meanwhile, the ECU 21 is configured to stop generating and transmitting the reproduced sound signal, during the stopping period of time of the approaching notification sound. Accordingly, the reproduction unit 11 is configured not to output the approaching notification sound.

The sound collecting unit 10 is configured to perform the same operation described in the first embodiment. In each of the collected sound signals of the microphones of the sound collecting unit 10, the approaching notification sound is included during the reproducing period of time of the approaching notification sound, and the approaching notification sound is not included during the stopping period of time of the approaching notification sound. Whenever the collected sound signals of the microphones are respectively received, the ECU 22 is configured to respectively perform the pre-processing on the collected sound signals, and obtain the collected sound signals $x_1(t)$ and $x_2(t)$ on which the pre-processing has been performed.

The ECU 22 is configured to perform the discrete Fourier transform on the collected sound signal $x_1(t)$ of one microphone to obtain the collected sound signal $X_1(\omega)$ by Expression (1), and is configured to perform the discrete Fourier transform on the collected sound signal $x_2(t)$ of the other microphone to obtain the collected sound signal $X_2(\omega)$ by Expression (2), at every predetermined time interval. The ECU 22 is configured to calculate the cross-correlation value $R_{12}(\tau)$ for each $\tau$ by using the collected sound signals $X_1(\omega)$ and $X_2(\omega)$ by Expression (3) during the stopping period of time of the approaching notification sound. In the subsequent processing, the ECU 22 is configured to perform the same processing as that of the ECU 21 according to the first embodiment. Meanwhile, the ECU 22 is configured not to detect the traveling sound (approaching processing) without calculating the cross-correlation value $R_{12}(\tau)$ during the reproducing period of time of the approaching notification sound.

According to the approaching vehicle detecting device 2, since the reproducing and the stopping of the approaching notification sound are repeated, the cross-correlation value is calculated (the traveling sound is detected) using all the frequency bands of the frequency characteristic of the collected sound information for only the period of time during which the reproducing of the approaching notification sound is stopped, and thus, it is possible to detect the approaching vehicle with high accuracy by using all the frequency bands without mistakenly detect the approaching notification sound as the traveling sound of the vehicle around the host vehicle.

Particularly, in the approaching vehicle detecting device 1 according to the first embodiment, the frequency bands in which the sound pressure is low need to be included in the frequency characteristic of the approaching notification sound. For this reason, the kind (the tone) of the approaching notification sound may be limited. However, in the approaching vehicle detecting device 2, since the traveling sound is not detected for the period of time during which the approaching notification sound is reproduced, there are no limitations on the frequency characteristic of the approaching notification sound. Thus, the kind of the approaching notification sound is not limited.

An approaching vehicle detecting device 3 according to a third embodiment will be described with reference to FIGS. 6, 7A, 7B, 7C and 7D. FIG. 6 is a configuration diagram of the approaching vehicle detecting device according to the third embodiment. FIGS. 7A, 7B, 7C and 7D show an example in which the frequency characteristic of the approaching notification sound is changed depending on a time change.

The approaching vehicle detecting device 3 has a difference from the approaching vehicle detecting device 1 according to the first embodiment in that since the frequency characteristic of the approaching notification sound generated from tie host vehicle is changed with time (the frequency characteristic of the approaching notification sound is changed at predetermined short time intervals), the traveling sound is detected by excluding the frequency hands in which the sound pressure of the approaching notification sound with the frequency characteristic of the approaching notification sound changed with time is high (that is, the frequency bands used to detect the traveling sound are changed depending on a time change of the frequency characteristic of the approaching notification sound). In the third embodiment, such a difference will be described in detail.

The approaching vehicle detecting device 3 includes a sound collecting unit 10, a reproduction unit 11, a vehicle state obtaining unit 12, and an ECU 23 (a reproduced sound frequency characteristic storage unit 23a, a vehicle state correspondence control unit 23b, a reproduced frequency characteristic control unit 23c, a frequency resolution unit 23d, and a traveling sound detecting unit 23e). In the third embodiment, the sound collecting unit 10 corresponds to a sound collecting unit described in the claims, the reproduction unit 11, the reproduced sound frequency characteristic storage unit 23a, the vehicle state correspondence control unit 23b and the reproduced frequency characteristic control unit 23c correspond to a warning unit described in the claims, the frequency resolution unit 23d corresponds to an analysis unit described in the claims, and the traveling sound detecting unit 23e corresponds to a detection unit described in the claims.

The ECU 23 is an electronic control unit that includes a CPU, a ROM, and a RAM, and is configured to generally control the approaching vehicle detecting device 3. The ECU 23 is configured to respectively receive collected sound signals from the sound collecting unit 10 and vehicle state signals from the vehicle state obtaining unit 12 at every predetermined time interval. The ECU 23 includes the reproduced sound frequency characteristic storage unit 23a in a predetermined area of the ROM. The ECU 23 is configured to perform various processing of the vehicle state correspondence control unit 23b, the reproduced frequency characteristic control unit 23c, the frequency resolution unit 23d and the traveling sound detecting unit 23e at every predetermined time interval by loading application programs stored in the ROM into the RAM and executing the loaded application programs in the CPU. By performing the various processing, the ECU 23 is configured to transmit the reproduced sound signal to the reproduction unit 11, or transmit an approaching vehicle information signal to the driving support device. The reproduced sound frequency characteristic storage unit 23a is the same storage unit as the reproduced sound frequency characteristic storage unit 21a according to the first embodiment, and thus, the description thereof will be omitted. The vehicle state correspondence control unit 23b and the frequency resolution unit 23d perform the same processes as those of the vehicle state correspondence control unit 21b and the frequency resolution unit 21c according to the first embodiment, and thus, the description thereof will be omitted.

In order to change the frequency characteristic of the approaching notification sound reproduced in the reproduction unit 11 with time, the reproduced frequency characteristic control unit 23c is configured to control such that the frequency characteristic of the approaching notification sound is changed for a short period of time. Even when the frequency characteristic of the approaching notification sound is changed for the short period of time, the reproduced frequency characteristic control unit is configured to control such that a person who hears the approaching notification sound does not feel discomforted due to the change of the frequency characteristic and the traveling sound is reliably detected. Thus, similarly to the first embodiment, a basic approaching notification sound that is easily recognized by a person who hears the approaching notification sound and is not a cacophonous sound is produced, and this approaching notification sound is previously stored in the reproduced sound frequency characteristic storage unit 23a. Frequency characteristics of a plurality of sounds are generated by resolving the basic approaching notification sound at predetermined frequency band intervals, and the sounds having the plurality of frequency characteristics are switched for a short period of time. As stated above, there is a sound as if the basic approaching notification sound is reproduced by switching the respective sounds having the frequency characteristics resolved from the basic approaching notification sound within the short period of time. The number of resolved frequency characteristics, the resolved frequency band intervals, and the switching time intervals are previously set according to circumstances such that there is a sound as if the basic approaching notification sound is reproduced. The plurality of frequency band intervals corresponding to the number of resolved frequency characteristics may be the same frequency band interval, or may be different frequency band intervals depending on the frequency bands in which the sound pressure of the frequency characteristic of the basic approaching notification sound is high. The plurality of sounds having different frequency characteristics may be switched in a regular order, or may be switched in a random order.

Figure 7A:
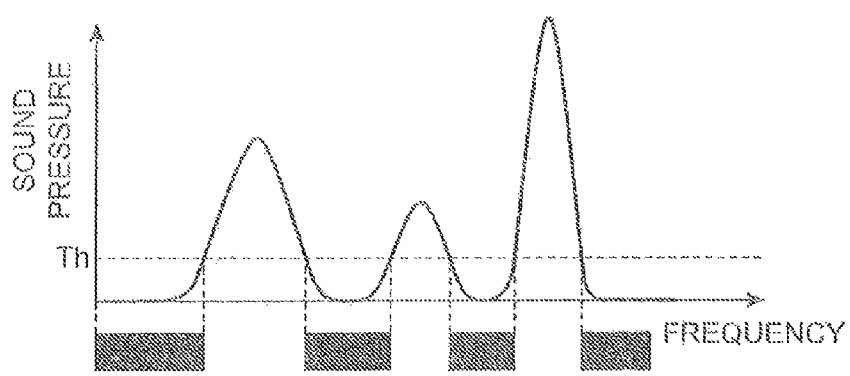
Figure 7B:
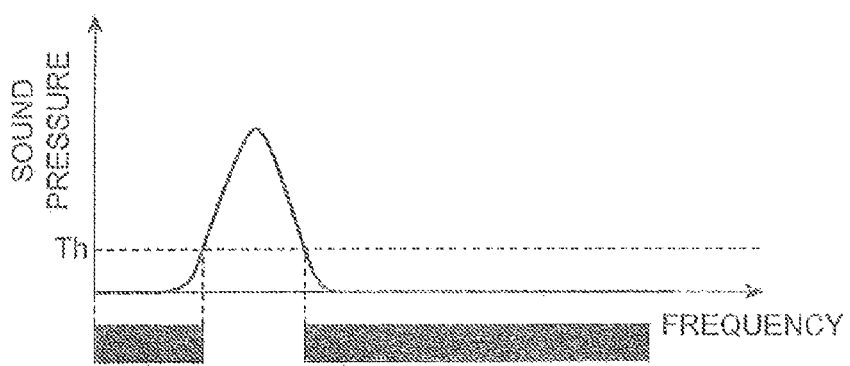

FIGS. 7A, 7B, 7C and 7D show an example in which the frequency characteristic (near 800 to 3000 Hz) of the basic approaching notification sound shown in FIG. 7A is resolved into three. A frequency characteristic of a first sound shown in FIG. 7B is a frequency characteristic resolved from a low frequency band of the basic approaching notification sound.

Figure 7C:
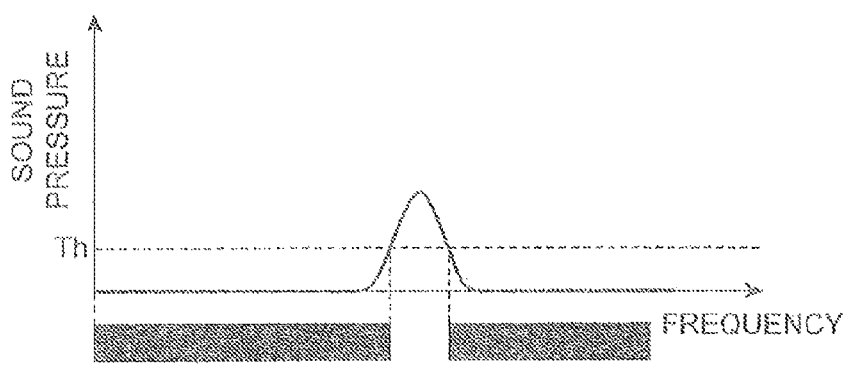
Figure 7D:
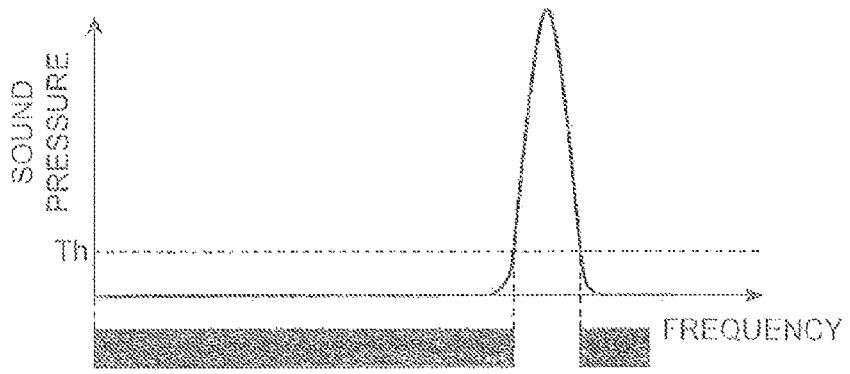

A frequency characteristic of a second sound shown in FIG. 7C is a frequency characteristic resolved from an intermediate frequency band of the basic approaching notification sound. A frequency characteristic of a third sound shown in FIG. 7D is a frequency characteristic resolved from a high frequency band of the basic approaching notification sound. By reproducing the basic approaching notification sound by switching the first to third sounds for a short period of time, a person can hear the basic approaching notification sound.

As specific processing, when the vehicle state correspondence control unit 23b extracts the basic approaching notification sound, the reproduced frequency characteristic control unit 23c is configured to resolve the basic approaching notification sound at predetermined frequency intervals, and generate frequency characteristics of a plurality of sounds having only frequency characteristics of different frequency bands of the basic approaching notification sound. Whenever the switching time intervals elapse, the reproduced frequency characteristic control unit 23c is configured to sequentially select the frequency characteristics of the plurality of resolved sounds, generate the reproduced sound signal (the electrical signal) for reproducing the sound having the selected frequency characteristics, start to transmit the reproduced sound signal to the reproduction unit 11, and continue to transmit the reproduced sound signal to the reproduction unit 11 during the switching time intervals.

It has been described that the frequency characteristic of the basic approaching notification sound is previously stored in the reproduced sound frequency characteristic storage unit 23a, the frequency characteristic of the basic approaching notification sound is resolved in the reproduced frequency characteristic control unit 23c, and the frequency characteristics of the plurality of sounds are generated. However, the frequency characteristics of the plurality of resolved sounds may be previously stored in the reproduced sound frequency characteristic storage unit 23a.

The frequency characteristics of the sounds resolved from the frequency characteristic of the basic approaching notification sound are different frequency characteristics, and frequency bands in which the sound pressure is high are different. Accordingly whenever the frequency characteristics of the reproduced sounds are switched, it is necessary change the frequency band used to detect the traveling sound. As can be seen from the example of FIGS. 7A, 7B, 7C and 7D, the frequency band used to detect the traveling sound in the frequency characteristics of the resolved sounds is a frequency band wider than the frequency band capable of being used to detect the traveling sound in the frequency characteristic of the basic approaching notification sound.

The traveling sound detecting unit 23e is configured to obtain the cross-correlation value $R_{12}(\tau)$ between the collected sound signals $X_1(\omega)$ and $X_2(\omega)$ on which the frequency resolution has been performed in the frequency resolution unit 23d, detect the traveling sound based on the cross-correlation value $R_{12}(\tau)$, and determine whether or not the detected traveling sound is approaching the host vehicle. Similarly to the traveling sound detecting unit 21d according to the first embodiment, the traveling sound detecting unit 23e is configured to introduce the function $M(\omega)$ represented by Expression (4), and calculate the cross-correlation value $R_{12}(\tau)$ from Expression (5). Particularly, whenever the frequency characteristics of the sounds reproduced in the reproduced frequency characteristic control unit 23c are switched, the traveling sound detecting unit 23e changes $X_m(\omega)$ used in the function $M(\omega)$.

As specific processing, the traveling sound detecting unit 23e is configured to obtain the value of the function $M(\omega)$ of Expression (4) for each frequency $\omega$ by using the frequency characteristic $X_m(\omega)$ of the sound that is currently reproduced under the control of the reproduced frequency characteristic control unit 23c. The traveling sound detecting unit 23e is configured to sequentially calculate the cross-correlation value $R_{12}(\tau)$ by changing the value of τ within a range of—T to T by using the collected sound signals $X_1(\omega)$ and $X_2(\omega)$ and the value of the function $M(\omega)$ of each frequency $\omega$ by Expression (5). In the subsequent processing, the traveling sound detecting unit 23e is configured to perform the same processing as that of the traveling sound detecting unit 21d according to the first embodiment.

The flow of the operation of the approaching vehicle detecting device 3 having the above-described configuration will be described. The vehicle state obtaining unit 12 is configured to perform the same operation described in the first embodiment. When the vehicle state signal is received, the ECU 23 is configured to extract the frequency characteristic of the basic approaching notification sound corresponding to the vehicle state indicated by the vehicle state signal from the reproduced sound frequency characteristic storage unit 23a. The ECU 23 is configured to resolve the basic approaching notification sound at predetermined frequency intervals to be resolved, and generate the frequency characteristics of the plurality of sounds. At every switching time interval, the ECU 23 is configured to sequentially select the frequency characteristic of one sound from the frequency characteristics of the plurality of resolved sounds, generate the reproduced sound signal for reproducing the sound having the selected frequency characteristics, and transmit the reproduced sound signal to the reproduction unit 11. When the reproduced sound signal is received, the reproduction unit 11 is configured to amplify the reproduced sound signal in the amplifier, and convert the reproduced sound signal into voice to output the sound in the speaker. The frequency characteristic of the sound reproduced from the reproduction unit 11 is switched at short time intervals.

The sound collecting unit 10 is configured to perform the same operation described in the first embodiment. The sounds reproduced from the reproduction unit 11 are respectively included in the collected sound signals collected by the respective microphones of the sound collecting unit 10, and the frequency characteristics of the sounds are switched at the short time intervals. When the collected sound signals of the microphones are respectively received, the ECU 23 is configured to respectively perform the pre-processing on the collected sound signals, and obtain the collected sound signals $x_1(t)$ and $x_2(t)$ on which the pre-processing has been performed.

At every predetermined time interval, the ECU 23 is configured to perform the discrete Fourier transform on the collected sound signal $x_1(t)$ of one microphone to obtain the collected sound signal $X_1(\omega)$ by Expression (1), and is configured to perform the discrete Fourier transform on the collected sound signal $x_2(t)$ of one microphone to obtain the collected sound signal $X_2(\omega)$ by Expression (2). The ECU 23 is configured to calculate the cross-correlation value $R_{12}(\tau)$ for each τ by using the collected sound signals $X_1(\tau)$ and $X_2(\tau)$ and the value of the function $M(\omega)$ for each frequency $\omega$ by Expression (5). In this case, the value (1 or 0) of the function $M(\omega)$ represented by Expression (4) for each frequency $\omega$ is obtained by using the frequency characteristic $X_m(\omega)$ of the currently reproduced sound. The frequency characteristic $X_m(\omega)$ of the sound is switched at the short time intervals. In the subsequent processing, the ECU 23 is configured to perform the same processing as that of the ECU 21 according to the first embodiment.

According to the approaching vehicle detecting device 3, since the frequency characteristic of the approaching notification sound is switched at the short time intervals, by changing the frequency band that is not used to calculate the cross-correlation value (detect the traveling sound) depending on the frequency characteristic of the switched approaching notification sound, it is possible to prevent the approaching notification sound from being mistakenly detected as the traveling sound of the vehicle around the host vehicle, and it is possible to detect the approaching vehicle from the collected sound information with high accuracy. Since the approaching vehicle detecting device 3 is configured to resolve the frequency characteristic of the basic approaching notification sound and switch the sounds having the resolved frequency characteristics, it sounds as if the reproduced sound is the basic approaching notification sound, and a person around the host vehicle does not feel discomforted.

Particularly, in the approaching vehicle detecting device 1 according to the first embodiment, since the frequency characteristic of the approaching notification sound is not changed with time (but is changed depending on the change of the vehicle state), the frequency bands in which the sound pressure capable of being used to detect the traveling sound is equal to or less than the threshold are constantly the same frequency band. For this reason, when the frequency bands in which the sound pressure of the traveling sound of another vehicle present around the host vehicle is high and the frequency bands in which the sound pressure of the approaching notification sound is high are the same frequency band, since the same frequency band in the frequency characteristic of the traveling sound of another vehicle is masked by the approaching notification sound, there is a possibility that the detection performance of the traveling sound will be degraded. However, in the approaching vehicle detecting device 3, since the frequency characteristic of the approaching notification sound is changed with time, the frequency bands in which the sound pressure is equal to or less than the threshold are changed with time. For this reason, even when there is a time zone in which the frequency bands in which the sound pressure of the traveling sound of another vehicle is high and the frequency bands in which the sound pressure of the approaching notification sound is high are the same frequency band, when the short period of time elapses and the frequency characteristic of the approaching notification sound is changed, the frequency bands in which the sound pressure of the traveling sound of another vehicle and the frequency bands in which the sound pressure of the approaching notification sound is high are different frequency bands, and thus, it is possible to prevent the detection performance of the traveling sound from being degraded.

Although the embodiments of the present invention have been described, the present invention is carried out in various forms without limiting the above-described embodiments.

For example, the present embodiment is applied to the approaching vehicle detecting device (the object detection device) that is mounted on the vehicle to detect the approaching vehicle the traveling sound of the vehicle as the sound source), but may be applied to another configuration. For example, the present embodiment may be incorporated in the driving support device, as an approaching vehicle detecting function, or a warning function may be incorporated in the approaching vehicle detecting device. Although it has been described in the present embodiment that the vehicle is detected as an object, another object that generates sound may be detected.

Although it has been described in the present embodiment that the warning device is incorporated in the approaching vehicle detecting device, another configuration may be provided. For example, the warning device may be incorporated in a traveling control device of the vehicle, or may be provided as a single warning device.

It has been described in the present embodiment that the microphone array including two or more microphones of the sound collecting unit is used, the vehicle (the traveling sound) is detected based on the difference between the sound arrival times of the microphones, and it is determined whether or not the detected vehicle is the approaching vehicle. However, one microphone may be used, and another method may be used as the method of detecting the sound source. Particularly, when one microphone is used, since the method using the sound arrival time difference cannot be used, another method is used. Only whether or not there is a vehicle around the host vehicle may be detected, and whether or not the vehicle is approaching may not be determined.

Although it has been described in the present embodiment that the approaching notification sound resembling the traveling sound of the vehicle is used as the warning sound generated from the vehicle, various other warning sounds generated from the vehicle (particularly, sounds of which the frequency characteristics are already known) may be used. Although it has been described in the present embodiments that the frequency characteristic of the approaching notification sound is previously stored, information regarding the frequency bands in which the sound pressure of the frequency characteristic of the approaching notification sound is greater than the threshold and information regarding the frequency bands in which the sound pressure is equal to or less than the threshold may be previously stored. The function $M(\omega)$ may not be introduced by previously storing these information items.

It has been described in the present embodiments that the frequency characteristic of the approaching notification sound (the warning sound) is already known and the frequency characteristic of the approaching notification sound is previously stored. However, when the frequency characteristic of the warning sound is not previously known, the warning sound generated from the warning device of the vehicle may be collected, the frequency analysis may be performed on the collected warning sound, and the frequency characteristic of the warning sound may be obtained through the frequency analysis.

It has been described in the present embodiment that it is determined whether or not the sound pressure of each frequency of the frequency characteristic of the approaching notification sound is equal to or greater than the threshold and only the frequency bands in which the sound pressure is less than the threshold are used to detect the traveling sound without using the frequency bands in which the sound pressure is equal to or greater than the threshold. However, as the sound pressure of a predetermined frequency band becomes higher, the utilization of this frequency band in the detection of the traveling sound may be suppressed, and as the sound pressure of a predetermined frequency band becomes lower, the utilization of this frequency band in the detection of the traveling sound may be enhanced. For example, by performing the process of weighting on the respective frequency bands (the respective frequencies), lower weights are applied to the frequency bands as the sound pressure becomes higher, and higher weight are applied to the frequency bands as the sound pressure becomes lower.

Although it has been described in the present embodiment that the frequency characteristic of the approaching notification sound is changed depending on the vehicle state (the speed, the engine speed, the motor speed, or the brake pedal depression amount), the frequency characteristic of the approaching notification sound may be fixed regardless of the vehicle state.

Although it has been described in the second embodiment that the traveling sound is not detected for the period of time during which the approaching notification sound is generated, the traveling sound may be detected using the method (the method of detecting the traveling sound by excluding the frequency bands in which the sound pressure of the approaching notification sound is high) of the first embodiment or the third embodiment even for the period of time during which the approaching notification sound is generated.

Although it has been described in the third embodiment that the basic approaching notification sound is produced, the basic approaching notification sound is resolved, and the sounds having the resolved frequency characteristics are switched at the short time intervals, a plurality of arbitrary sounds having different frequency characteristics may be produced without resolving a basic sound.

INDUSTRIAL APPLICABILITY

The present invention can be used in object detection for detecting an object around a vehicle based on sound information around the vehicle.

REFERENCE SIGNS LIST 1, 2, 3 . . . Approaching vehicle detecting device
10 . . . Sound collecting unit
11 . . . Reproduction unit
12 . . . Vehicle state obtaining unit
21, 22, 23 . . . ECU
21a, 22a, 23a . . . Reproduced sound frequency characteristic storage unit
21b, 22b, 23b . . . Vehicle state correspondence control unit
21c, 22d, 23d . . . Frequency resolution unit
21d, 22e, 23e . . . Traveling sound detecting unit
22c . . . Reproduction timing control unit
23c . . . Reproduced frequency characteristic control unit

The invention claimed is:

1. An object detection device configured to detect an object around a vehicle based on sound information around the vehicle, the device comprising:
   a sound collecting unit mounted on the vehicle;
   an analysis unit configured to perform frequency analysis on sound information collected by the sound collecting unit; and
   a detection unit configured to detect the object around the vehicle based on a frequency characteristic of the sound information analyzed by the analysis unit,
   wherein, based on a frequency characteristic of a warning sound generated from a warning device mounted on the vehicle, the detection unit is configured to perform object detection such that object detection using a predetermined frequency band when a sound pressure of the predetermined frequency band of the warning sound is high is more suppressed than object detection using the predetermined frequency band when a sound pressure of the predetermined frequency band of the warning sound is low,
   the warning sound generated from the warning device is capable of being intermittently generated, and
   the detection unit is configured to perform object detection by using all frequency bands of the frequency characteristic of the sound information analyzed by the analysis unit for a period of time during which the warning sound is not generated.

2. The object detection device according to claim 1, wherein the frequency characteristic of the warning sound generated from the warning device is capable of being changed depending on a time change, and
   the detection unit is configured to change a frequency band used in the object detection according to the frequency characteristic of the warning sound changed depending on the time change.

3. The object detection device according to claim 1, wherein the detection unit is configured to inhibit object detection using the predetermined frequency band in which the sound pressure is greater than a reference value when a sound pressure of the predetermined frequency band of the warning sound is greater than the reference value, and perform object detection using the predetermined frequency band in which the sound pressure is less than the reference value when a sound pressure of the predetermined frequency band of the warning sound is less than the reference value.

4. An object detection method for detecting an object around a vehicle based on sound information around the vehicle, the method comprising:
   an analysis step of performing frequency analysis on sound information collected by a sound collecting unit mounted on the vehicle; and
   a detection step of detecting the object around the vehicle based on a frequency characteristic of the sound information analyzed in the analysis step,
   wherein, based on a frequency characteristic of a warning sound generated from a warning device mounted on the vehicle, in the detection step, object detection is performed such that object detection using a predetermined frequency band when a sound pressure of the predetermined frequency band of the warning sound is high is more suppressed than object detection using a predetermined frequency band when a sound pressure of the predetermined frequency band of the warning sound is low,
   wherein the warning sound generated from the warning device is capable of being intermittently generated, and
   the detecting step uses all frequency bands of the frequency characteristics of the sound information for a period of time during which the warning sound is not generated.

* * * * *